(No Model.)

E. F. HAMMEKEN.
FREIGHT CAR.

No. 428,093. Patented May 20, 1890.

WITNESSES:
David B. Williams
John Scott

INVENTOR:
Edward F. Hammeken,
By his attorney,
Horace Pettit.

UNITED STATES PATENT OFFICE.

EDWARD F. HAMMEKEN, OF MEXICO, MEXICO.

FREIGHT-CAR.

SPECIFICATION forming part of Letters Patent No. 428,093, dated May 20, 1890.

Application filed January 20, 1890. Serial No. 337,503. (No model.)

*To all whom it may concern:*

Be it known that I, EDWARD F. HAMMEKEN, of the city of Mexico, Mexico, have invented a certain new and useful Improvement in Freight-Cars; and I do hereby declare the following to be a full, clear, and exact description thereof, reference being had to accompanying drawings, forming part of this specification.

My invention has relation to the rapid loading and unloading of freight-cars; and it consists in a car provided with a movable or false bottom set on rollers, as hereinafter particularly described.

The object of my invention is to produce a car for transportation of goods and other material which can be loaded and unloaded in a comparatively short space of time, thus doing away with the necessity of allowing the car to occupy and block the tracks for a long time, as in the usual process of loading and unloading.

I will now describe my invention, so that others skilled in the art to which it appertains may make and use the same, reference being had to the accompanying drawings, in which similar letters of reference refer to similar parts throughout.

Figure 1:
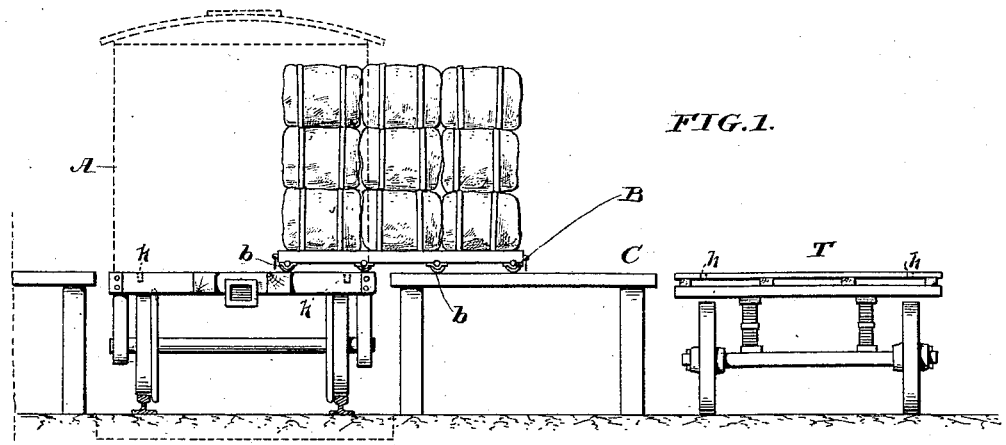
Figure 2:
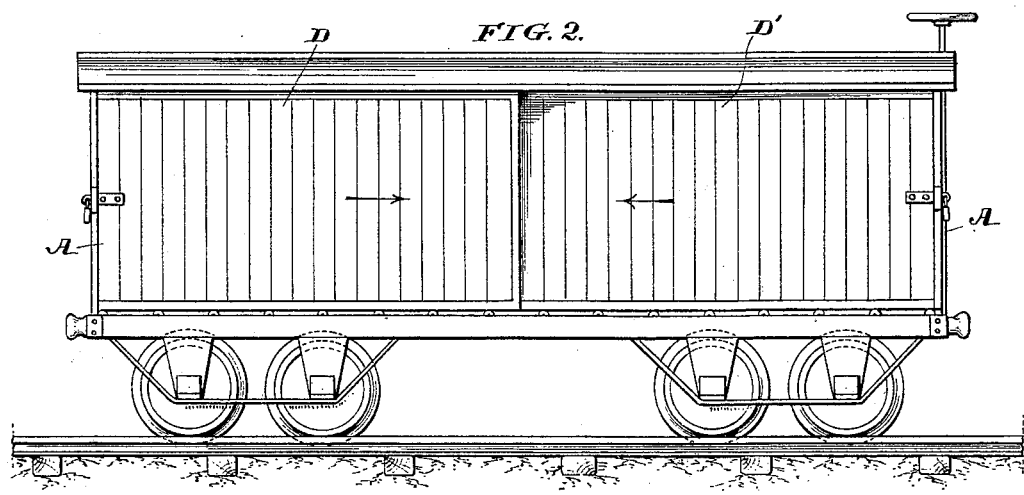
Figure 3:
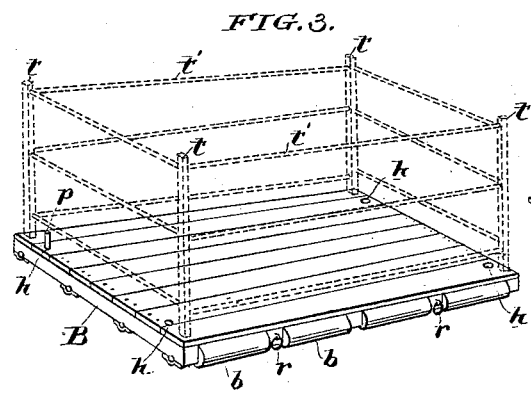
Figure 4:
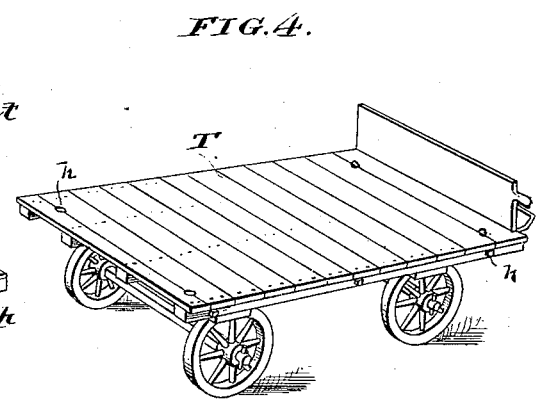

Figure 1 is a cross-sectional elevation showing the movable bottom of the car with the freight upon it in the act of being removed onto the station-platform and from thence, if desired, onto the wagon-truck shown. Fig. 2 is a side view of the freight-car with the sliding doors closed. Fig. 3 is the movable bottom detached from the car, and showing in dotted lines posts and cross-bars which may be employed for inclosing small freight. Fig. 4 is a perspective view of a wagon or truck of a suitable construction to receive the removable bottom of the car direct with the goods thereon.

A is the main body of the car.

B is the false movable bottom of the car, provided with the rollers $b$.

C represents the freight-platform, and T is the wagon or truck.

The car A is provided, preferably, with two sliding doors D D' on either side, hung on pulleys on a rail. These doors are each half the length of the car and slide the one back of the other. I preferably employ two of the false movable bottoms B, each half the length of the inside of the car, so that by sliding back the door D or D' the car may be loaded or unloaded one half at a time. In the construction of the bottom B, I employ two or more series of rollers adjusted to the under part of the bottom B, secured by journal-bearings or other suitable means, so that they may be easily and readily moved in and out of the cars and upon the platform or onto the wagon with the freight upon it by pushing or pulling.

A hole $h$ is provided in each corner of the movable bottom B, through which a pin $p$ is inserted and into the bottom of the car, fitting in a hole or receptacle therein provided for the end of the pin, so that the bottoms B may be retained in place while the car is in motion. Rings $r$ are provided in the sides of the movable bottoms B, into which chains may be hooked to facilitate the drawing about of the said movable bottoms B.

In the process of loading, the goods are loaded onto the two respective movable bottoms B while on the platform C or wagon T before the car to be loaded shall have arrived. When the car is drawn up to the platform, the door D or D' is slid back, exposing one half the car, and if loaded one of the movable bottoms B, with the freight thereon, is drawn out of the car by chains or otherwise, and the other loaded movable bottom with the freight thereon for shipment is pushed into the car from the platform, as shown in Fig. 1. The door is then drawn and closed and the other door slid open and the other half of the car exposed, and the goods thereupon unloaded by withdrawing the other movable bottom from the car, and that half of the car reloaded by rolling in the movable bottom B, previously loaded on the platform C with the goods for shipment. In this manner, as will be seen, the cars are most readily loaded and unloaded with loss of but little time, allowing of their removal from the station yard or platform immediately and the substitution of other cars.

The wagon-body T shown is of a suitable construction to receive the movable bottoms B, so that the freight already packed on the said bottoms B may be hauled to and from the cars directly to points desired without reloading the several articles.

Posts *t* and cross-pieces *t'* (shown in the dotted lines in Fig. 3) may be attached in any desirable manner to the bottom B, as shown in the drawings, to support the goods to be shipped when desired. This is especially useful when the bottoms B are placed on the wagon-bodies T. In such case the pins *p*, as hereinbefore described, for securing the movable bottoms to the car, are also employed, passing through the bottom B into holes provided in the wagon-bed T.

I am aware that freight-cars adapted to accommodate and pack portable trucks to facilitate rapid loading and unloading have heretofore been known and used. This I do not claim, broadly.

My invention resides in the specific construction hereinbefore particularly described and herein claimed.

Having thus described my invention, what I claim, and desire to secure by Letters Patent, is—

1. In a railroad freight-car, the combination of false movable bottoms, each of said false bottoms being provided on the under part with three or more series of rollers set longitudinally with the bottom in fixed journal-bearings, said rollers being recessed in said false bottoms to allow the said false bottoms to come into close proximity with the fixed car-bottom, two or more sliding doors provided on each side of the car, guide and supporting rails set longitudinally on each side of the said car, and pulleys secured to said sliding doors set and adapted to roll upon said rails supporting said doors, substantially as hereinbefore set forth and described.

2. In a railroad freight-car, the combination of two bottoms, one fixed and one set of removable bottoms, said removable bottoms movable on said fixed bottom, slightly raised, each being provided on its under side with three or more series of longitudinal rollers journaled in fixed journals and recessed to allow of close proximity of the movable to the fixed bottom, two or more sliding doors on each side of the car provided in the length of the car, adapted to slide one behind the other by means of pulleys on longitudinal rails, rings or means provided on the said removable false bottoms for adjusting securing-chains, 'holes provided in the said fixed and false bottoms one above the other, and pins adapted to be adjusted therein for securing the said fixed and false bottoms together when desired, in the manner and for the purpose substantially as hereinbefore set forth and described.

3. The combination, in a railroad freight-car, of fixed and movable bottoms, said removable bottoms movable laterally on said fixed bottom, slightly raised above said fixed bottom, each movable bottom being provided on its under side with three or more series of longitudinal rollers journaled in fixed bearings and recessed in said fixed bottom to admit of the close proximity of the movable to the fixed bottom, posts and cross-pieces set removably in said removable bottoms for securing the freight in position in said bottoms, two or more sliding doors provided on each side of the car in the length of the car, adapted to slide one behind the other by means of pulleys on longitudinal rails, rings provided on said removable false bottoms for the accommodation of drawing-chains, securing-pins, and orifices provided in said false and fixed bottoms over each other for the accommodation of said securing-pin for securing the false bottoms in position, substantially as hereinbefore set forth and described.

In witness whereof I have hereunto set my hand this 3d day of January, A. D. 1890.

EDWARD F. HAMMEKEN.

Witnesses:
  THOS. RYAN,
  E. C. BUTLER.